United States Patent
Hong et al.

(10) Patent No.: US 10,411,790 B2
(45) Date of Patent: Sep. 10, 2019

(54) APPARATUS AND METHOD FOR ACCESSING STAR NETWORK/MESH NETWORK OF TIME DIVISION MULTIPLE ACCESS (TDMA)/SINGLE CHANNEL PER CARRIER (SCPC) INTEGRATED SATELLITE COMMUNICATION

(71) Applicant: Electronics and Telecommunications Research Institute, Daejeon (KR)

(72) Inventors: Hyun Ha Hong, Daejeon (KR); Mankyu Park, Daejeon (KR); Deock Gil Oh, Daejeon (KR); Joon Gyu Ryu, Daejeon (KR); Dae Ig Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 57 days.

(21) Appl. No.: 15/726,006

(22) Filed: Oct. 5, 2017

(65) Prior Publication Data

US 2018/0241460 A1 Aug. 23, 2018

(30) Foreign Application Priority Data

Feb. 23, 2017 (KR) .................. 10-2017-0024303

(51) Int. Cl.
*H04H 20/74* (2008.01)
*H04B 7/185* (2006.01)
(Continued)

(52) U.S. Cl.
CPC ............. *H04B 7/185* (2013.01); *H04H 20/42* (2013.01); *H04H 20/74* (2013.01); *H04H 40/90* (2013.01); *H04H 60/80* (2013.01); *H04H 60/90* (2013.01); *H04N 7/20* (2013.01); *H04H 2201/33* (2013.01); *H04L 27/0008* (2013.01)

(58) Field of Classification Search
CPC ........ H04H 20/74; H04H 40/90; H04H 60/90; H04B 7/185; H04N 7/20
See application file for complete search history.

(56) References Cited

U.S. PATENT DOCUMENTS

RE41,218 E 4/2010 Fielding et al.
8,369,775 B2 2/2013 Karabinis et al.
(Continued)

*Primary Examiner* — Wei Zhao
(74) *Attorney, Agent, or Firm* — William Park & Associates Ltd.

(57) ABSTRACT

Disclosed is a star network/mesh network accessing method and apparatus of a terminal in a satellite communication system, the method including receiving time slot resources from a central station and operating in a time division multiple access (TDMA) start network communication mode between the central station and a terminal, transferring, to the central station, a TDMA mesh network connection request message for a destination terminal, receiving traffic burst time plan (TBTP) information corresponding to the TDMA mesh network connection request message from the central station and operating in a TDMA mesh network communication mode between terminals, and switching from the TDMA mesh network communication mode between the terminals to a single channel per carrier (SCPC) mesh network communication mode between the terminals when Voice over Internet Protocol (VoIP) traffic is greater than a threshold.

17 Claims, 9 Drawing Sheets

(51) Int. Cl.
*H04H 60/90* (2008.01)
*H04N 7/20* (2006.01)
*H04H 40/90* (2008.01)
*H04H 20/42* (2008.01)
*H04H 60/80* (2008.01)
*H04L 27/00* (2006.01)

(56) References Cited

U.S. PATENT DOCUMENTS

| | | |
|---|---|---|
| 8,423,863 B2 | 4/2013 | Kim et al. |
| 9,008,094 B2 | 4/2015 | Kim et al. |
| 2006/0050660 A1* | 3/2006 | Wells .................. H04B 7/18582 370/316 |
| 2006/0126576 A1* | 6/2006 | Dale .................. H04B 7/18584 370/336 |
| 2013/0170435 A1* | 7/2013 | Dinan ..................... H04L 45/50 370/328 |

* cited by examiner

APPARATUS AND METHOD FOR ACCESSING STAR NETWORK/MESH NETWORK OF TIME DIVISION MULTIPLE ACCESS (TDMA)/SINGLE CHANNEL PER CARRIER (SCPC) INTEGRATED SATELLITE COMMUNICATION

CROSS-REFERENCE TO RELATED APPLICATION(S)

This application claims the priority benefit of Korean Patent Application No. 10-2017-0024303 filed on Feb. 23, 2017, in the Korean Intellectual Property Office, the disclosure of which is incorporated herein by reference for all purposes.

BACKGROUND

1. Field

One or more example embodiments relate to method and apparatus for controlling star network/mesh network access and connection for direct communication between a central station and a terminal and between terminals.

2. Description of Related Art

A satellite communication network may include a satellite body, a central station, and a plurality of terminals, and provide various multimedia services such as a voice, an image, data, and the like to a user. The satellite communication network may include a mesh network for direct communication between terminals and a star network for communication between the central station and the terminal. Also, the satellite communication network may generally use a time division multiple access (TDMA) scheme and a single channel per carrier (SCPC) scheme.

In related arts, a TDMA star network/mesh network may transmit information from a central station to a terminal based on a digital video broadcasting-satellite-second generation (DVB-S2)-based time-division multiplexing (TDM) forward link transmission scheme, and transmit information from a terminal to a central station or to another terminal based on a digital video broadcasting-return channel via satellite second generation (DVB-RCS2)-based multi-frequency (MF)-TDMA return link transmission scheme. In this example, a terminal may simultaneously receive a TDM forward link receiving function and an MF-TDMA signal and may have a high processing function in terms of bursty Internet Protocol (IP) traffic transmission in comparison to an SCPC star network/mesh network through a dynamic resource allocation in units of mesh network time slot.

In related arts, an SCPC star network/mesh network may transmit information from a central station to a terminal based on a DVB-S2-based TDM forward link transmission scheme and transmit information from a terminal to a central station or to another terminal using SCPC transmission technology. In this example, a terminal may have an SCPC transmitting and receiving function in addition to the TDM forward link receiving function, and may have a high processing function in terms of a high capacity fine transmission and module service in comparison to the TDMA star network/mesh network through a resource allocation in units of dedicated carrier.

As such, the TDMA star network/mesh network and the SCPC star network/mesh network may be different in traffic type for providing a high processing function. Thus, there is a desire for a method of providing a satellite communication service in which benefits of the TDMA star network/mesh network and the SCPC star network/mesh network are combined and disadvantages of the TDMA star network/mesh network and the SCPC star network/mesh network are alleviated.

SUMMARY

An aspect provides a method and apparatus for providing a satellite communication service in which benefits of an SCPC network and a TDMA network are combined.

According to an aspect, there is provided a star network/mesh network accessing method of a terminal in a satellite communication system, the method including receiving time slot resources from a central station and operating in a time division multiple access (TDMA) start network communication mode between the central station and a terminal, transferring, to the central station, a TDMA mesh network connection request message for a destination terminal, receiving traffic burst time plan (TBTP) information corresponding to the TDMA mesh network connection request message from the central station and operating in a TDMA mesh network communication mode between terminals, and switching from the TDMA mesh network communication mode between the terminals to a single channel per carrier (SCPC) mesh network communication mode between the terminals when Voice over Internet Protocol (VoIP) traffic is greater than a threshold.

The star network/mesh network accessing method may further include operating in a TDMA star network communication mode between the central station and the terminal when the TDMA mesh network communication mode between the terminals or the SCPC mesh network communication mode between the terminals is terminated.

The star network/mesh network accessing method may further include switching from the SCPC mesh network communication mode between the terminals to the TDMS mesh network communication mode between the terminals when an operation is performed in the SCPC mesh network communication mode and the VoIP traffic is less than the threshold.

The operating in the TDMA star network communication mode may include receiving a time slot resource on a TDMA return link from the central station, and operating in the TDMA star network communication mode using the received time slot resource.

The operating in the TDMA mesh network communication mode may include transmitting, to the central station, the TDMA mesh network connection request message for the destination terminal, receiving, from the central station, a TDMA mesh network connection response message of the destination terminal in response to the TDMA mesh network connection request message, receiving, by a source terminal, the TBTP information from the central station via a time-division multiplexing (TDM) forward link, and operating in the TDMA mesh network communication mode between the terminals based on the TBTP information.

The switching to the SCPC mesh network communication mode may include transmitting an SCPC mesh network connection request message for the destination terminal to the central station, receiving, from the central station, TBTP information including a time slot resource allocated in response to the SCPC mesh network communication request message, and operating in the SCPC mesh network communication mode between the terminals based on the TBTP information.

In the time slot resource, integer multiple traffic bursts may be dynamically allocated in units of frame period in response to a request from the source terminal or the destination terminal.

Traffic burst to be connected to the TDMA mesh network or the SCPC mesh network may include Internet Protocol (IP) information divided into run-length encoding (RLE) packets based on a size of burst payload to be packed in a burst payload with a burst header, and a burst header including source identification information for identifying a source terminal and destination identification information for identifying a destination terminal.

Traffic burst to be connected to the TDMA star network may include IP information divided into RLE packets based on a size of burst payload to be packed in a burst payload with a burst header, and a burst header including source identification information for identifying a source terminal and network identification information for distinguishing between a star network and a mesh network.

According to another aspect, there is also provided a satellite communication system including a source terminal configured to receive time slot resources from a central station, operate in a TDMA start network communication mode between the central station and a terminal, transfer a TDMA mesh network connection request message for a destination terminal to the central station, receive TBTP information corresponding to the TDMA mesh network connection request message from the central station, operate in a TDMA mesh network communication mode between terminals, and switch from the TDMA mesh network communication mode between the terminals to an SCPC mesh network communication mode between the terminals when VoIP traffic is greater than a threshold.

The source terminal may be configured to operate in a TDMA star network communication mode between the central station and the terminal when the TDMA mesh network communication mode between the terminals or the SCPC mesh network communication mode between the terminals is terminated.

The source terminal may be configured to switch from the SCPC mesh network communication mode between the terminals to the TDMA mesh network communication mode between the terminals when an operation is performed in the SCPC mesh network communication mode and the VoIP traffic is less than the threshold.

The source terminal may be configured to transmit the TDMA mesh network connection request message for the destination terminal to the central station, receive, from the central station, a TDMA mesh network connection response message of the destination terminal in response to the TDMA mesh network connection request message, receive the TBTP information from the central station via a TDM forward link, and operate in the TDMA mesh network communication mode between the terminals based on the TBTP information.

The source terminal may be configured to transmit an SCPC mesh network connection request message for the destination terminal to the central station, receive, from the central station, TBTP information including a time slot resource allocated in response to the SCPC mesh network communication request message, and operate in the SCPC mesh network communication mode between the terminals based on the TBTP information.

In the time slot resource, integer multiple traffic bursts may be dynamically allocated in units of frame period in response to a request from the source terminal or the destination terminal.

Traffic burst to be connected to the TDMA mesh network or the SCPC mesh network may include IP information divided into RLE packets based on a size of burst payload to be packed in a burst payload with a burst header, and a burst header including source identification information for identifying a source terminal and destination identification information for identifying a destination terminal.

Traffic burst to be connected to the TDMA star network may include IP information divided into RLE packets based on a size of burst payload to be packed in a burst payload with a burst header, and a burst header including source identification information for identifying a source terminal and network identification information for distinguishing between a star network and a mesh network.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 8 is a diagram illustrating an example of a TDMA/SCPC mesh network encapsulation and a traffic burst configuration according to an example embodiment; and.

DETAILED DESCRIPTION

Figure 1:
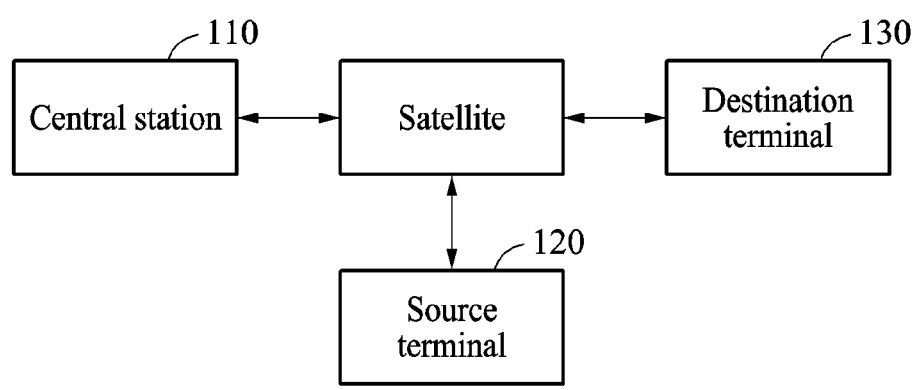
FIG. 1 is a diagram illustrating a time division multiple access (TDMA)/single channel per carrier (SCPC) integrated satellite communication system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure. A star network/mesh network access method of a time division multiple access (TDMA)/single channel per carrier (SCPC) integrated satellite communication system may be performed by a source terminal or a destination terminal corresponding to a star network/mesh network access apparatus of a TDMA/SCPC integrated satellite communication system.

FIG. 1 is a diagram illustrating a TDMA/SCPC integrated satellite communication system according to an example embodiment.

Referring to FIG. 1, a TDMA/SCPC integrated satellite communication system may include a central station 110, a source terminal 120, and a destination terminal 130.

The central station 110 may have a system control function to perform resource management and access control for an access to a TDMA star network or an access to an SCPC start network between the source terminal 120 and the destination terminal 130, and the central station 110.

Also, when the source terminal 120 or the destination terminal 130 requests the access to the TDMA star network or the SCPC star network, the central station 110 may allocate time slot resources to an access-requested terminal. Also, the central station 110 may transfer a time slot allocated to the access-requested terminal. In this example, the access-request terminal between the source terminal 120 and the destination terminal 130 may access the TDMA star network or the SCPC star network using the time slot allocated by the central station 110.

The source terminal 120 may transmit a message requesting an access to the TDMA star network or the SCPC star network to the central station 110. Also, the source terminal 120 may receive a message including the time slot allocated to the source terminal 120 from the central station 110. In this example, the source terminal 120 may access the TDMA star network or the SCPC star network using the time slot included in the message The source terminal 120 may transmit a message requesting an access to the TDMA mesh network or the SCPC mesh network between the destination terminal 130 and the source terminal 120 to the central station 110. In this example, the central station 110 may transfer the received message to the destination terminal 130, receive a response to the message from the destination terminal 130, and transfer the response to the source terminal 120. When the response to the message is an access acceptance, the central station 110 may transmit traffic burst time plan (TBTP) information to the source terminal 120. Also, the source terminal 120 may access the TDMA mesh network or the SCPC mesh network between the destination terminal 130 and the source terminal 120 based on the received TBTP information.

The source terminal 120 may switch a communication mode based on traffic. For example, when the source terminal 120 is connected to the TDMA star network or the TDMA mesh network, and when a traffic corresponding to the source terminal 120 is greater than a threshold, the source terminal 120 may switch a communication mode from a TDMA star network communication mode or a TDMA mesh network communication mode to an SCPC star network communication mode or an SCPC mesh network communication mode.

Also, when the source terminal 120 is connected to the SCPC star network or the SCPC mesh network, and when the traffic corresponding to the source terminal 120 is reduced to be less than the threshold, the source terminal 120 may switch a communication mode from the SCPC star network communication mode or the SCPC mesh network communication mode to the TDMA star network communication mode or the TDMA mesh network communication mode.

The destination terminal 130 may receive a message requesting an access to the TDMA mesh network or the SCPC mesh network between the destination terminal 130 and the source terminal 120 from the central station 110. Also, the destination terminal 130 may transmit a response to the received message to the central station 110.

The destination terminal 130 may be a terminal performing communication with the source terminal 120 in response to a request from the source terminal 120, and may include the same function as the source terminal 120. For example, the destination terminal 130 and the source terminal 120 may be the same terminal and may be distinguished based on whether a user of the corresponding terminal is a sender or a recipient.

Thus, the destination terminal 130 may access the TDMA star network or the SCPC star network through the same process as the source terminal 120. Also, the destination terminal 130 may access the TDMA mesh network or the SCPC mesh network between the destination terminal 130 and the source terminal 120 based on the TBTP information received from the central station 110.

The TDMA/SCPC integrated satellite communication system may be switched from an SCPC-based network to a TDMA-based network based on the traffic, thereby providing a satellite communication service in which a benefit of the SCPC-based network is combined with a benefit of the TDMA-based network.

The TDMA/SCPC integrated satellite communication system may quickly change a satellite communication operation mode such as the TDMA mesh network, the SCPC mesh network, the SCPC star network at an interval of a frame period based on a quality of service (QoS) request, thereby maximizing an application of limited satellite resources, for example, a channel and a time slot. Accordingly, the TDMA/SCPC integrated satellite communication system may be applicable to services of various fields such as satellite Internet, satellite communication for disaster, satellite backhaul, and satellite Internet of things.

Figure 2:
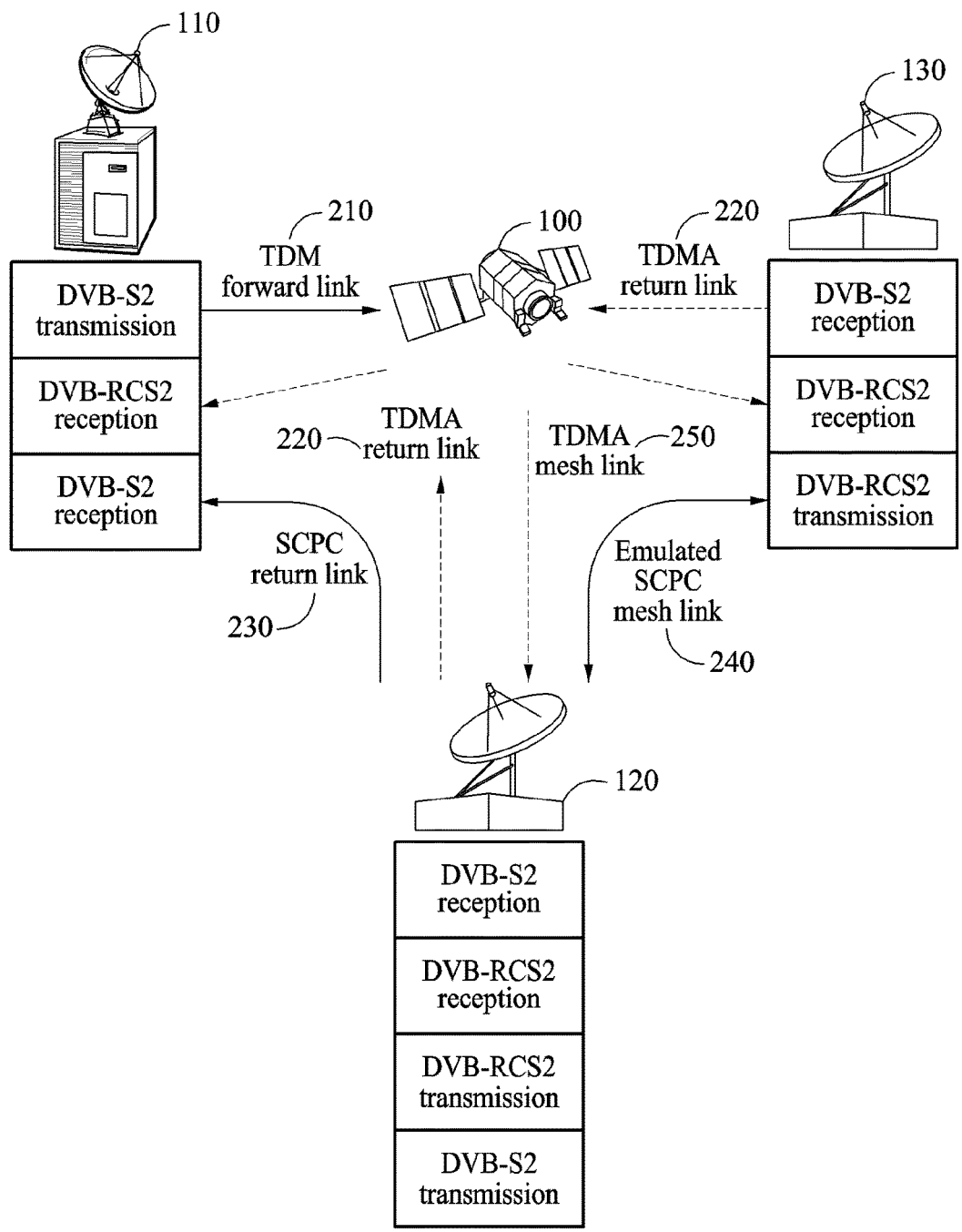
FIG. 2 is a diagram illustrating a TDMA/SCPC integrated satellite communication network according to an example embodiment.

FIG. 2 is a diagram illustrating a TDMA/SCPC integrated satellite communication network according to an example embodiment.

Referring to FIG. 2, in the TDMA/SCPC integrated satellite communication system, the central station 110 may be connected to the source terminal 120 and the destination terminal 130 through a forward link 210, return links 220 and 230, and mesh links 240 and 250.

The central station 110 may include a system control function including, for example, a digital video broadcasting-satellite-second generation (DVB-S2) transmitting function, a digital video broadcasting-return channel via satellite second generation (DVB-RCS2) receiving function, a connection control, and a resource management for accessing a TDMA star network or a mesh network between the central station 110 and the source terminal 120 and the destination terminal 130. Also, the central station 110 may include the DVB-S2 receiving function for accessing an SCPC star network between the central station 110 and the source terminal 120 and the destination terminal 130.

The source terminal 120 and the destination terminal 130 may include the DVB-S2 receiving function and the DVB-RCS2 transmitting and receiving function for accessing the TDMA star network or the mesh network between the central station 110 and the source terminal 120 and the destination terminal 130. In this example, the source terminal 120 and the destination terminal 130 may receive a forward link signaling message from the central station 110 to perform a terminal control function such as a TDMA-based return link access and a resource request.

The source terminal 120 and the destination terminal 130 may include the DVB-S2 transmitting function for accessing the SCPC star network between the central station 110 and the source terminal 120 and the destination terminal 130.

Also, the source terminal 120 and the destination terminal 130 may further include a mesh DVB-S2 transmitting and receiving function for accessing the SCPC mesh network between each other. In this example, the SCPC mesh network of the TDMA/SCPC integrated satellite communication system may be an emulated SCPC based on a TDMA mesh extension scheme.

Figure 3:
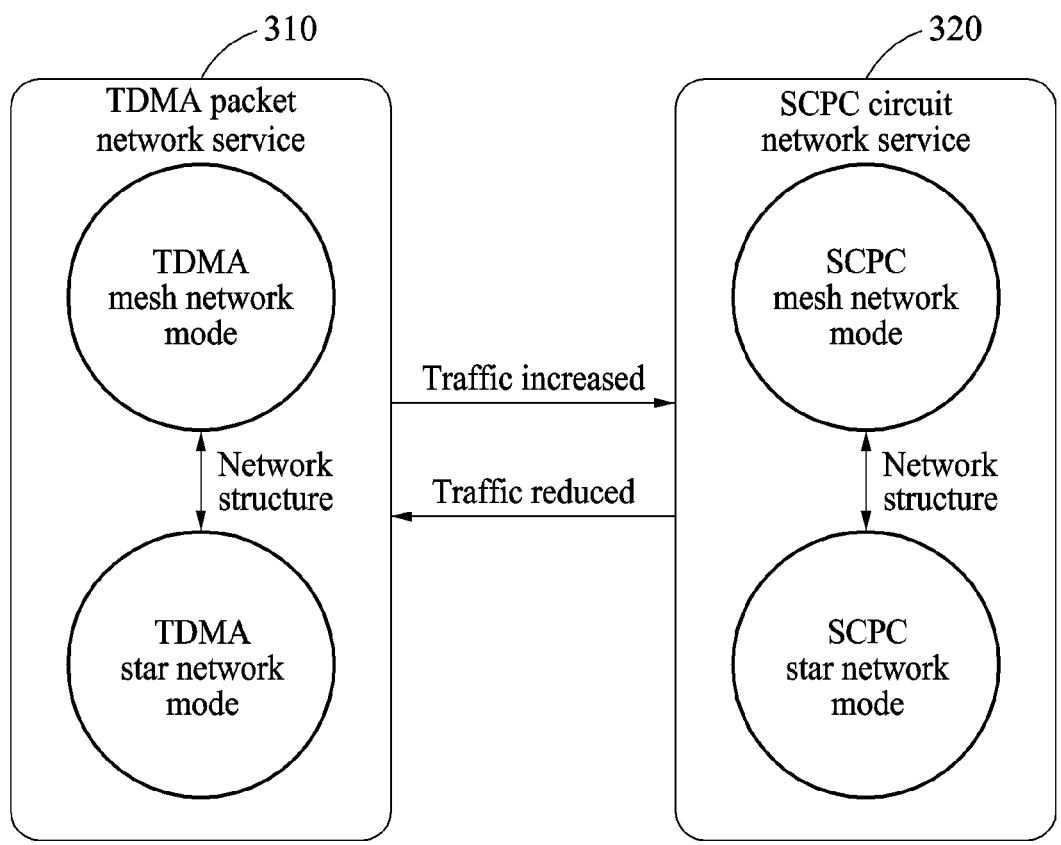
FIG. 3 is a diagram illustrating operable modes of a TDMA/SCPC integrated satellite communication system according to an example embodiment.

FIG. 3 is a diagram illustrating operable modes of a TDMA/SCPC integrated satellite communication system according to an example embodiment.

When a TDMA star network connection is completed, the source terminal 120 and the destination terminal 130 of the TDMA/SCPC integrated satellite communication system may dynamically switch a system operation mode to a TDMA packet network and SCPC circuit network service providing mode based on an application service and a traffic situation, thereby significantly improving a system efficiency. In this example, the source terminal 120 and the destination terminal 130 may dynamically switch the system operation mode by performing an application layer connection control protocol between the central station 110 and terminals. The system operation mode may include at least one of, for example, a TDMA mesh network, an SCPC star network, an emulated SCPC mesh network, or an SCPC mesh network.

The source terminal 120 and the destination terminal 130 may switch an operation mode from the TDMA mesh network mode to the TDMA star network based on a mode application service to access the TDMA star network. Also, the source terminal 120 and the destination terminal 130 may switch an operation mode from the TDMA star network mode to the TDMA mesh network mode based on an application service to access the TDMA mesh network.

The source terminal 120 and the destination terminal 130 may switch an operation mode from the SCPC mesh network mode to the SCPC star network mode based on the application service to access the SCPC star network. Also, the source terminal 120 and the destination terminal 130 may switch an operation mode from the SCPC star network mode to the SCPC mesh network mode based on the application service to access the SCPC mesh network.

A TDMA packet network service 310 may be robust to bursty traffic transmission and vulnerable to high-capacity real-time traffic. In contrast, an SCPC packet network service 320 may be robust to the high-capacity real-time traffic and vulnerable to the bursty traffic transmission.

For example, traffic may increase to be in a steady traffic state while the source terminal 120 or the destination terminal 130 is connected to the TDMA packet network service 310. In this example, the TDMA/SCPC integrated satellite communication system may determine that the high-capacity real-time traffic occurs. Also, the TDMA/SCPC integrated satellite communication system may switch a communication network to which the source terminal 120 or the destination terminal 130 is connected, from the TDMA packet network service 310 to the SCPC packet network service 320. Through this, the TDMA/SCPC integrated satellite communication system may process the high-capacity and real-time traffic occurring in the source terminal 120 or the destination terminal 130.

Also, traffic may decrease to be in a bursty traffic state while the source terminal 120 or the destination terminal 130 is connected to the SCPC packet network service 320. In this example, the TDMA/SCPC integrated satellite communication system may switch the communication network to which the source terminal 120 or the destination terminal 130, from the SCPC packet network service 320 to the TDMA packet network service 310. Through this, the TDMA/SCPC integrated satellite communication system may process the bursty traffic occurring in the source terminal 120 or the destination terminal 130.

Figure 4:
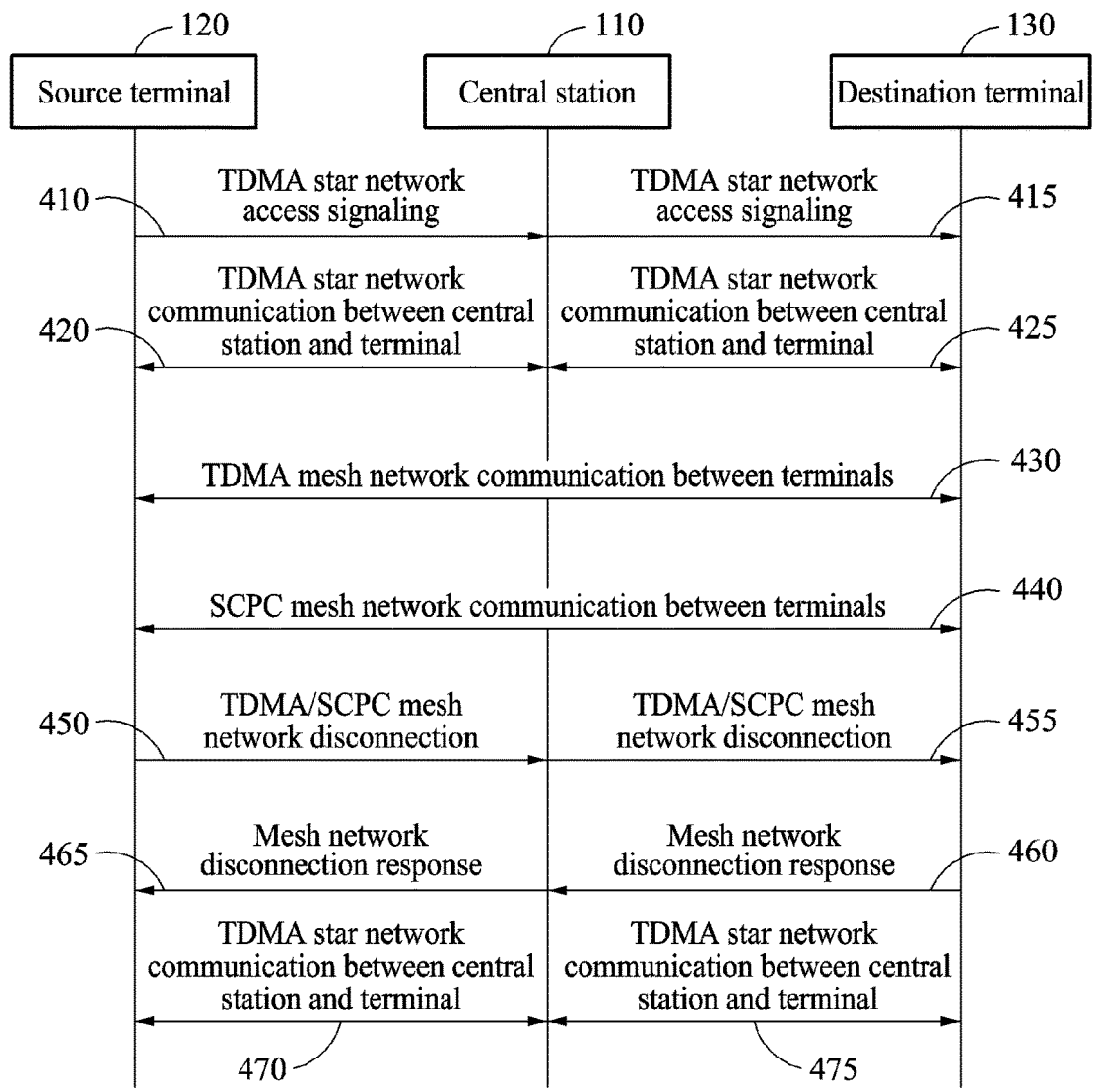
FIG. 4 is a diagram illustrating a star network/mesh network accessing method of a TDMA/SCPC integrated satellite communication system according to an example embodiment.

FIG. 4 is a diagram illustrating a star network/mesh network accessing method of a TDMA/SCPC integrated satellite communication system according to an example embodiment.

In operation 410, the source terminal 120 may perform a TDMA star network access signaling with the central station 110.

In operation 415, the destination terminal 130 may perform a TDMA star network access signaling with the central station 110.

In operation 420, the source terminal 120 may receive a time slot resource on a TDMA return link from the central station 110 and operate in a TDMA star network communication mode with the central station 110.

In operation 425, the destination terminal 130 may receive a time slot resource on a TDMA return link from the central station 110 and operate in the TDMA star network communication mode with the central station 110.

In operation 430, the source terminal 120 and the destination terminal 130 may operate in the TDMA mesh network communication mode. In this example, the source terminal 120 and the destination terminal 130 may exchange a TCP-based mesh network connection control message through the central station 110. A control message transmitted from the source terminal 120 and the destination terminal 130 to the central station 110 may be transmitted through time slots allocated to the source terminal 120 and the destination terminal 130. Also, the control message transmitted from the central station 110 to the source terminal 120 and the destination terminal 130 may be transmitted via a time-division multiplexing (TDM) forward link. The source terminal 120 and the destination terminal 130 operating in the TDMA mesh network communication mode will also be described with reference to FIG. 5.

In operation 440, the source terminal 120 and the destination terminal 130 may operate in an SCPC mesh network communication mode. The source terminal 120 and the destination terminal 130 operating in the SCPC mesh network communication mode will also be described with reference to FIG. 5.

Also, in operation 440, the source terminal 120 and the destination terminal 130 may operate in a DVB-S2-based SCPC star network communication mode. In this example, the central station 110 may receive a star network connection request message from the source terminal 120 and the destination terminal 130. Also, the central station 110 may allocate SCPC star network channel resources for the source terminal 120 and the destination terminal 130. The central station 110 may provide notification on the resource allocated to the source terminal 120 and the destination terminal 130 using a channel message. In response to the channel message being received, the source terminal 120 and the destination terminal 130 may operate in the SCPC star network communication mode.

In operation 450, the source terminal 120 may transmit a disconnection request message to the central station 110 to request a disconnection from a TDMA/SCPC mesh network.

In operation 455, the central station 110 may transmit the destination terminal 130 the disconnection request message received in operation 450.

In operation 460, the central station 110 may receive a response to the disconnection request message transmitted in operation 450 from the destination terminal 130. When the response is a disconnection message that admits a disconnection, the central station 110 may collect mesh resources allocated to the source terminal 120 and the destination terminal 130.

In operation 465, the central station 110 may transmit the response received from the destination terminal 130 in operation 460 to the source terminal 120. Also, the central station 110 may provide information indicating that the mesh resource allocated to the source terminal 120 is collected, to the source terminal 120.

In operation 470, the source terminal 120 may perform a TDMA star network communication between the central station 110 and the source terminal 120 using the same method used in operation 420.

In operation 475, the destination terminal 130 may perform a TDMA star network communication between the central station 110 and the destination terminal 130 using the same method used in operation 425.

Figure 5:
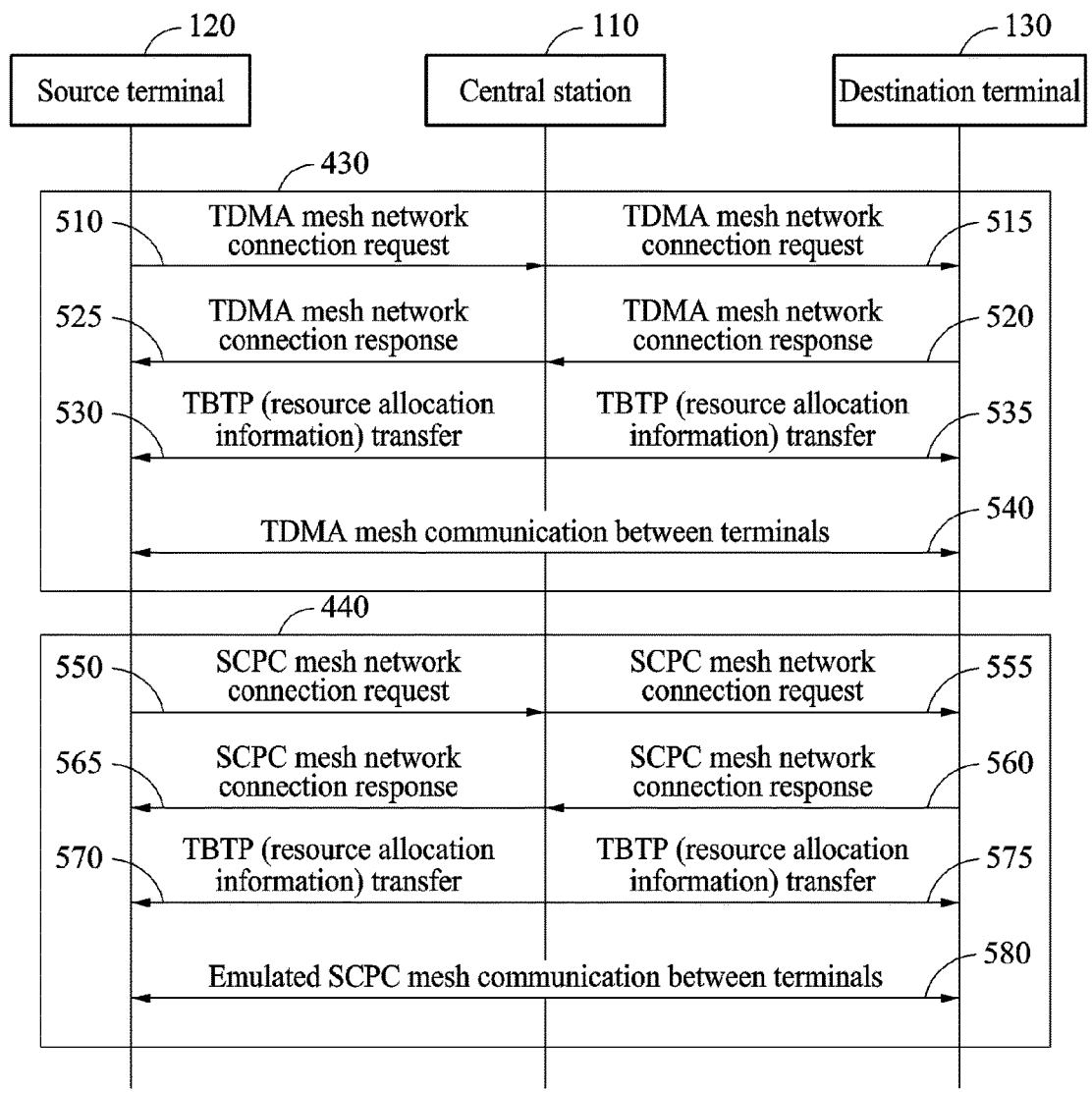
FIG. 5 is a diagram illustrating a mesh network communication method of FIG. 4.

FIG. 5 is a diagram illustrating a mesh network communication method of FIG. 4. Operation 510 through operation 540 of FIG. 5 may be included in operation 430 of FIG. 4. Also, operation 550 through operation 580 of FIG. 5 may be included in operation 440 of FIG. 4.

The source terminal 120 and the destination terminal 130 may be, for example, a mesh-control available very small aperture terminal (VSAT).

In operation 510, the source terminal 120 may transmit a TDMA mesh network connection request message for the destination terminal 130 to the central station 110.

In operation 515, the central station 110 may allocate TDMA mesh network time slot resources for the source terminal 120 and the destination terminal 130 in response to the TDMA mesh network connection request message received in operation 510. Also, the central station 110 may transmit the TDMA mesh network connection request message to the destination terminal 130.

In operation 520, the central station 110 may receive a TDMA mesh network connection response message corresponding to the TDMA mesh network connection request message from the destination terminal 130.

In operation 525, the central station 110 may verify the TDMA mesh network connection response message received in operation 520. Also, the central station 110 may transmit the verified TDMA mesh network connection response message to the source terminal 120.

In operation 530, the central station 110 may transmit TBTP information corresponding to resource allocation information to the source terminal 120 and the destination terminal 130 via a TDM forward link.

In operation 540, the source terminal 120 and the destination terminal 130 may operate in the TDMA mesh network communication mode between terminals based on the TBTP information received in operation 530.

In operation 550, the source terminal 120 may transmit an SCPC mesh network connection request message for the destination terminal 130 to the central station 110.

In operation 555, the central station 110 may allocate SCPC mesh network time slot resources to the source terminal 120 and the destination terminal 130 over the entire frame period in response to the SCPC mesh network connection request message received in operation 510. Also, the central station 110 may transmit the SCPC mesh network connection request message to the destination terminal 130.

In operation 560, the central station 110 may receive an SCPC mesh network connection response message corresponding to the SCPC mesh network connection request message from the destination terminal 130.

In operation 565, the central station 110 may transmit the SCPC mesh network connection response message received in operation 520 to the source terminal 120.

In operation 570, the central station 110 may transmit TBTP information corresponding to resource allocation information to the source terminal 120 and the destination terminal 130 via the TDM forward link.

In operation 580, the source terminal 120 and the destination terminal 130 may operate in an emulated SCPC mesh network communication mode between terminals based on the TBTP information received in operation 530.

Figure 6:
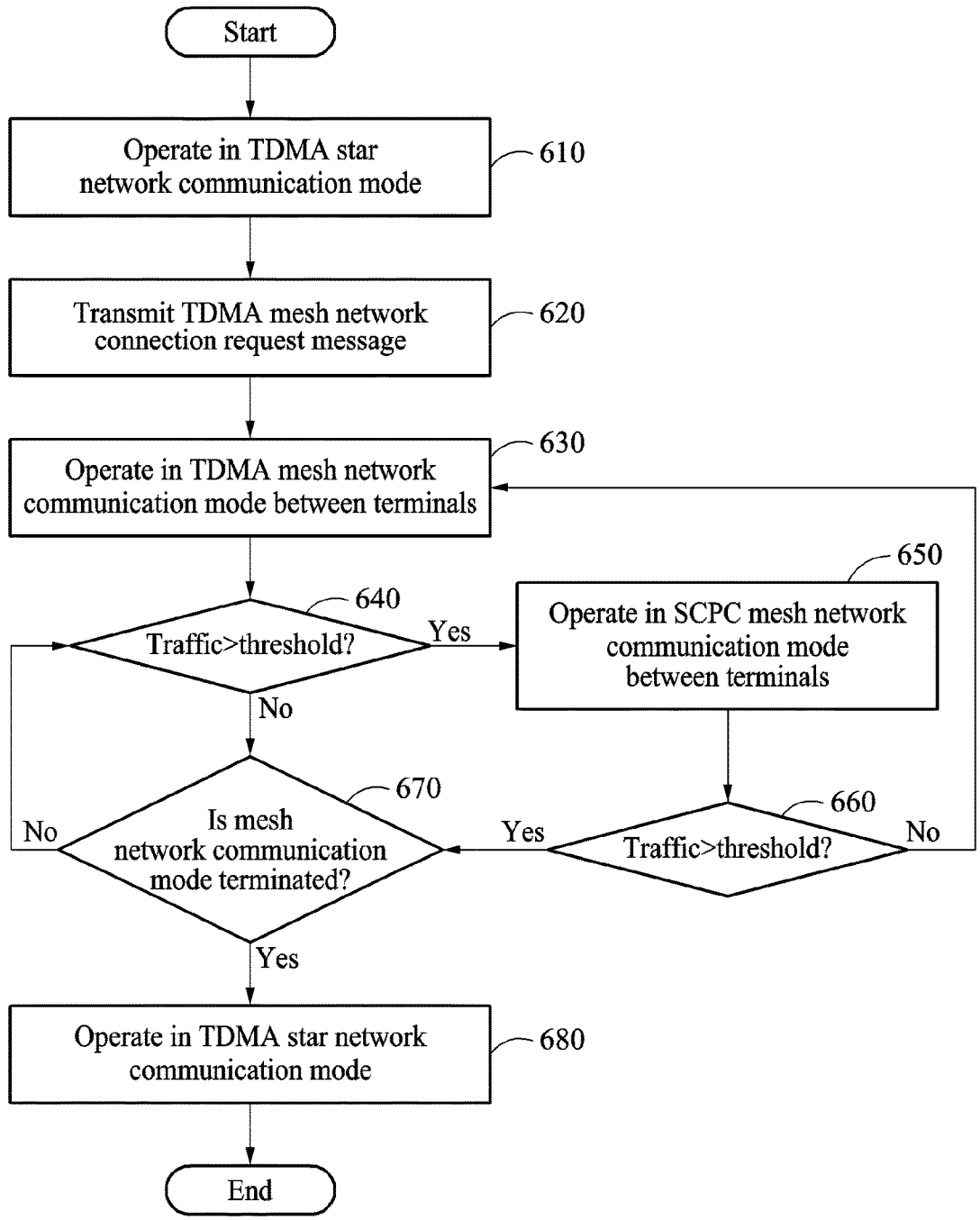
FIG. 6 is a flowchart illustrating an operation method of a source terminal in a TDMA/SCPC integrated satellite communication system according to an example embodiment.

FIG. 6 is a flowchart illustrating an operation method of a source terminal in a TDMA/SCPC integrated satellite communication system according to an example embodiment.

In operation 610, the source terminal 120 may receive a time slot resource allocated from the central station 110 and operate in a TDMA star network communication mode between a central station and a terminal. The source terminal 120 may receive the time slot resource on a TDMA return link from the central station 110. Also, the source terminal 120 may operate in the TDMA star network communication mode using the allocated time slot resource.

In operation 620, the source terminal 120 may transmit a TDMA mesh network connection request message for the destination terminal 130 to the central station 110.

In operation 630, the source terminal 120 may receive TBTP information corresponding to the TDMA mesh network connection request message from the central station and operate in a TDMA mesh network communication mode between the destination terminal 130 and the source terminal 120. A process up to transmitting the TBTP corresponding to the TDMA mesh network connection request message by the central station 110 may be performed identically to operation 515 through operation 530 of FIG. 5.

In operation 640, the source terminal 120 may verify whether VoIP traffic is greater than a threshold. When the VoIP traffic is greater than the threshold, the source terminal 120 may perform operation 650. Also, when the VoIP traffic is less than or equal to the threshold, the source terminal 120 may perform operation 670.

In operation 650, the source terminal 120 may be changed from the TDMA mesh network communication mode between the destination terminal 130 and the source terminal 120 to an SCPC mesh network communication mode between the destination terminal 130 and the source terminal 120. A process of operating in the SCPC mesh network communication mode between the destination terminal 130 and the source terminal 120 may be performed identically to operation 550 through operation 580 of FIG. 5.

In operation 660, the source terminal 120 may verify whether VoIP is greater than a threshold. When the VoIP traffic is greater than the threshold, the source terminal 120 may perform operation 670. Also, when the VoIP traffic is less than or equal to the threshold, the source terminal 120 may perform operation 630.

When the source terminal 120 is operating in the SCPC mesh network communication mode and the VoIP traffic is less than the threshold, the source terminal 120 may be changed from the SCPC mesh network communication mode between the destination terminal 130 and the source terminal 120 to the TDMA mesh network communication mode between the destination terminal 130 and the source terminal 120.

In operation 670, the source terminal 120 may verify whether a mesh network communication mode is terminated. When the SCPC mesh network communication mode between the destination terminal 130 and the source terminal 120 or the TDMA mesh network communication mode between the destination terminal 130 and the source terminal 120 is terminated, the source terminal 120 may perform operation 680. When the SCPC mesh network communication mode between the destination terminal 130 and the source terminal 120 or the TDMA mesh network communication mode between the destination terminal 130 and the source terminal 120 is not terminated, the source terminal 120 may perform operation 640.

In operation 680, the source terminal 120 may operate in the TDMA star network communication mode between the central station 110 and the source terminal 120 similarly to operation 610.

Figure 7:
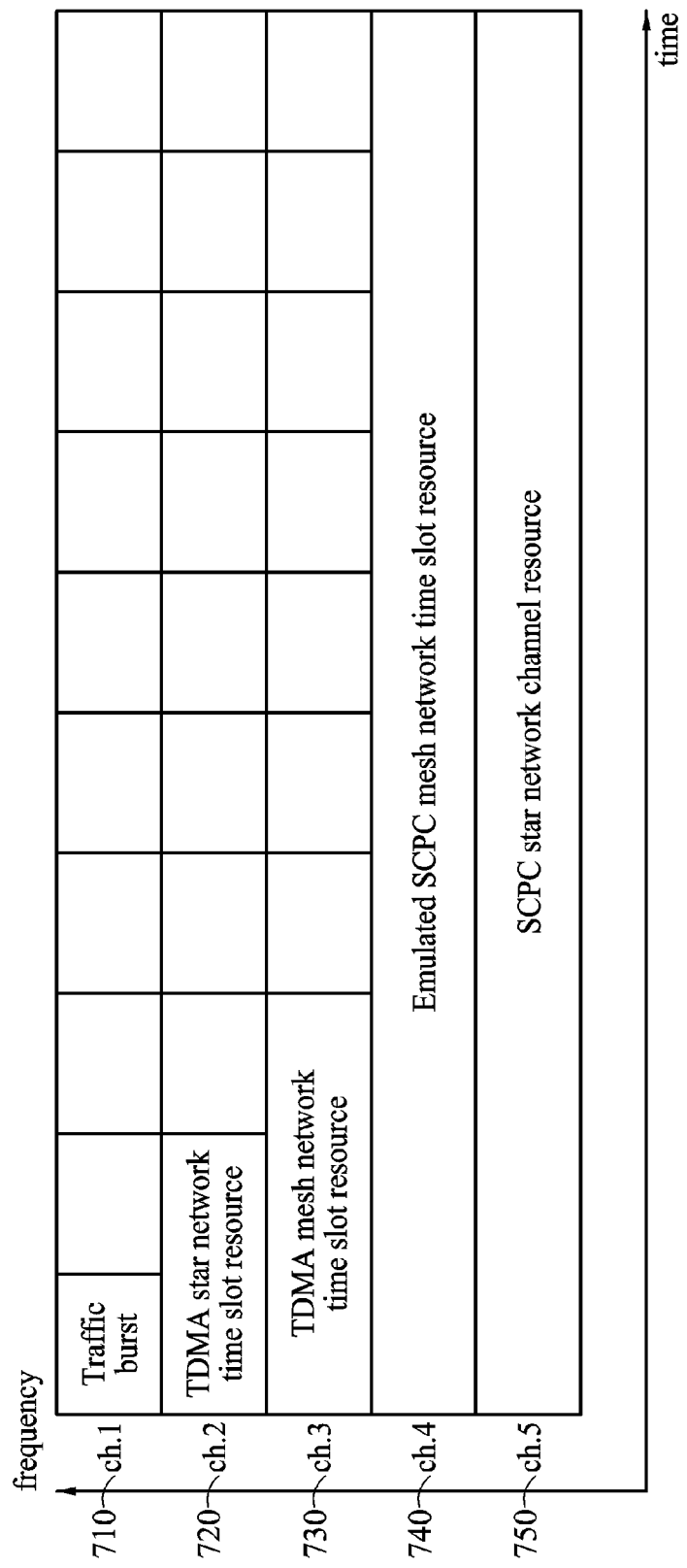
FIG. 7 is a diagram illustrating an example of allocating resources in a TDMA/SCPC integrated satellite communication system according to an example embodiment.

FIG. 7 is a diagram illustrating an example of allocating resources in a TDMA/SCPC integrated satellite communication system according to an example embodiment.

Referring to FIG. 7, the TDMA/SCPC integrated satellite communication system may allocate, to five channels, a time slot resource 720 for TDMA star network connection, a time slot resource 730 for TDMA mesh network connection, a time slot resource 740 for emulated SCPC mesh network connection, and a channel resource 750 for SCPC star network connection. The time slot resource 730 for TDMA mesh network and the time slot resource 740 for emulated SCPC mesh network may include a TDMA star network time slot resource for a mesh network connection control message exchange.

Also, in the TDMA/SCPC integrated satellite communication system, integer multiple traffic bursts 710 of a time slot resource may be dynamically allocated in units of frame period in response to a request from the source terminal 120 or the destination terminal 130.

In this example, the traffic bursts 710 may be adjusted to be in various sizes through a channel adaptive adaptive coding and modulation (ACM) control. Through this, the TDMA/SCPC integrated satellite communication system may achieve a relatively high efficiency with respect to bursty traffic transmission and a channel environment change such as rainfall attenuation.

Also, in the TDMA/SCPC integrated satellite communication system, the SCPC star network channel resource 750 may be appropriate for providing high capacity network services with a low jitter and a constant bandwidth.

The TDMA/SCPC integrated satellite communication system may freely switch an operation mode between the TDMA star network, the TDMA mesh network, and the emulated SCPC mesh network in response to the dynamic resource allocation in units of time slot. The TDMA/SCPC integrated satellite communication system may maximize resource utilization by providing a packet/circuit integrated service, and may be optimized for file transmission and mobile backhaul service acceptance through an SCPC star network integrated operation.

Figure 8:
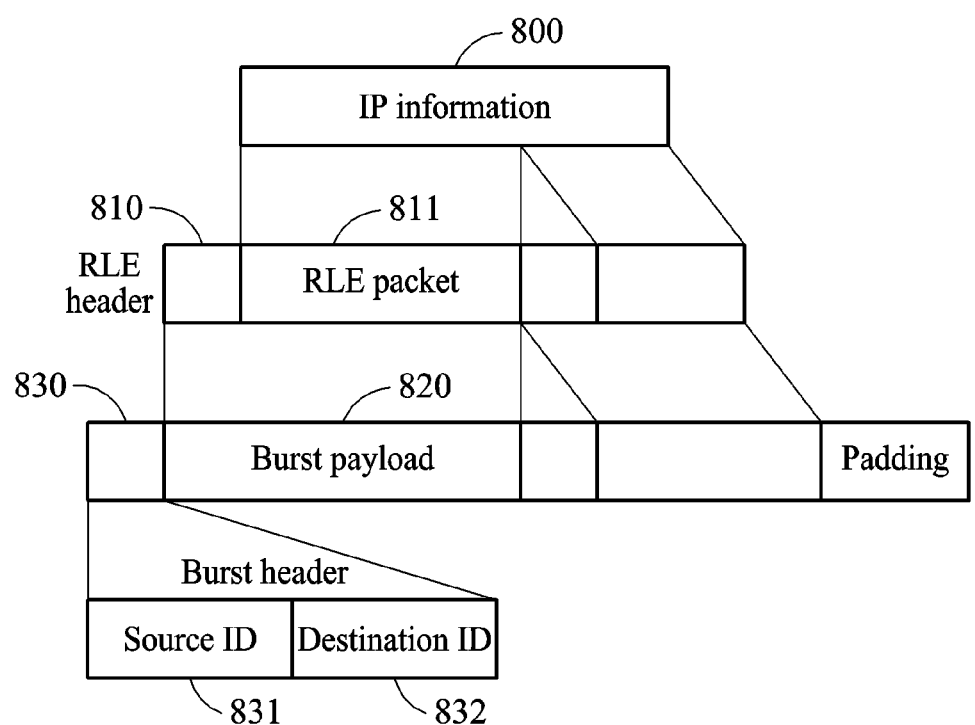

FIG. 8 is a diagram illustrating an example of a TDMA/SCPC mesh network encapsulation and traffic burst configuration according to an example embodiment.

Referring to FIG. 8, traffic burst and link encapsulation for TDMA and emulated SCPC mesh network connections may include IP information 800, a burst payload 820, and a burst header 830.

The IP information 800 may be divided into a plurality of run-length encoding (RLE) packets 811 based on a size of the burst payload 820 and packed with an RLE header 810 in the burst payload 820.

The burst header 830 may include source identification information 831 for identifying a source terminal and destination identification information 832 for identifying a destination terminal. The source identification information 831 and the destination identification information 832 may also be referred to as, for example, a source ID 831 and a destination ID 832, respectively.

In a traffic burst transmitting process, the source terminal 120 may transmit traffic burst by designating a destination ID of the destination terminal 130 with which the source terminal 120 is to communicate on an allocated time slot. In this example, all terminals included in the TDMA/SCPC integrated satellite communication system may examine the destination ID of the traffic burst transmitted from the source terminal 120. Also, when the destination ID does not match a terminal ID, the terminal may discard the corresponding traffic burst.

When the terminal ID matches the destination ID as is in the destination terminal 130, the corresponding terminal may recover IP information through an RLE packet reassembly process.

Also, a configuration of traffic burst and link encapsulation for connection to a TDMA star network or an SCPC star network may include the IP information 800, the burst payload 820, and the burst header 830 similarly to the traffic burst and the link encapsulation for mesh network connection as illustrated in FIG. 8.

In the TDMA star network and the SCPC star network, the source terminal 120 may communicate with the same target, the central station 110 and thus, may not require the destination identification information 832.

Thus, the burst header included in the traffic burst and the link encapsulation for connection to the TDMA star network or the SCPC star network may include the source identification information instead of the destination identification information.

Also, to apply the same structure traffic burst to a star network and a mesh network simultaneously, the burst header may further include a star network/mesh network identifier (1 bit) information corresponding to network identification information for distinguishing between the star network and the mesh network.

Figure 9:
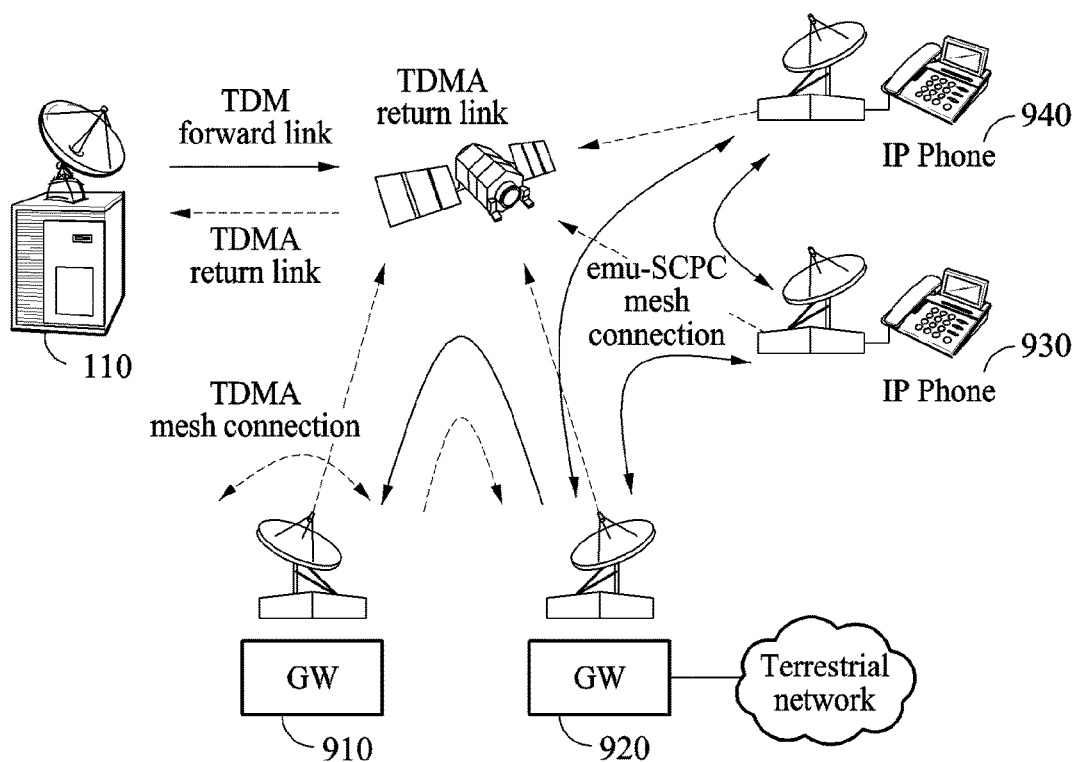
FIG. 9 is a diagram illustrating a TDMA/SCPC integrated satellite communication system providing a voice over Internet protocol (VoIP) service based on a mesh access according to an example embodiment.

FIG. 9 is a diagram illustrating a TDMA/SCPC integrated satellite communication system providing a voice over Internet protocol (VoIP) service based on a mesh access according to an example embodiment.

Referring to FIG. 9, in a TDMA/SCPC integrated satellite communication system, terminals 910, 920, 930, and 940 may be connected to one another through an emulated SCPC mesh network. Also, for interconnection with an external network, a predetermined terminal, for example, the terminal 920 may perform an interconnection function to provide a VoIP service. In this example, the predetermined terminal may be a terminal having a gateway function among terminals.

When VoIP traffic is significantly reduced to be less than an emulated SCPC mesh time slot resource in a state in which the central station 110 is connected to an emulated SCPC mesh network, the central station 110 may allocate a reduced mesh time slot resource based on a terminal-to-central station connection control procedure and switch to a TDMA mesh network communication mode, thereby maximizing a mesh link use efficiency.

Also, when the VoIP traffic increases to excess the mesh time slot resource in a state in which the central station 110 is connected to the TDMA mesh network, the central station 110 may allocate an increased mesh time slot resource based on the terminal-to-central station connection control procedure and return to an emulated the SCPC mesh network communication mode.

In FIG. 9, the terminal 910 and the terminal 920 may be connected through the TDMA mesh network, and the terminal 920 may be connected to the terminal 930 and 940 through the emulated SCPC mesh network. As such, the TDMA mesh network and the emulated SCPC mesh network may be mixed between terminals included in the TDMA/SCPC integrated satellite communication system.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A star network and mesh network accessing method of a terminal in a satellite communication system, the method comprising:
   receiving time slot resources from a central station and operating in a time division multiple access (TDMA) star network communication mode between the central station and the terminal;
   transferring, to the central station, a TDMA mesh network connection request message for a destination terminal;
   receiving traffic burst time plan (TBTP) information corresponding to the TDMA mesh network connection request message from the central station and operating in a TDMA mesh network communication mode between terminals; and
   switching from the TDMA mesh network communication mode between the terminals to a single channel per carrier (SCPC) mesh network communication mode between the terminals when Voice over Internet Protocol (VoIP) traffic is greater than a threshold.

2. The star network and mesh network accessing method of claim 1, further comprising:
   operating in a TDMA star network communication mode between the central station and the terminal when the TDMA mesh network communication mode between the terminals or the SCPC mesh network communication mode between the terminals is terminated.

3. The star network and mesh network accessing method of claim 1, further comprising:
   switching from the SCPC mesh network communication mode between the terminals to the TDMS mesh network communication mode between the terminals when an operation is performed in the SCPC mesh network communication mode and the VoIP traffic is less than the threshold.

4. The star network and mesh network accessing method of claim 1, wherein the operating in the TDMA star network communication mode includes:
   receiving a time slot resource on a TDMA return link from the central station; and
   operating in the TDMA star network communication mode using the received time slot resource.

5. The star network and mesh network accessing method of claim 1, wherein the operating in the TDMA mesh network communication mode includes:
   transmitting, to the central station, the TDMA mesh network connection request message for the destination terminal;
   receiving, from the central station, a TDMA mesh network connection response message of the destination terminal in response to the TDMA mesh network connection request message;
   receiving, by a source terminal, the TBTP information from the central station via a time-division multiplexing (TDM) forward link; and
   operating in the TDMA mesh network communication mode between the terminals based on the TBTP information.

6. The star network and mesh network accessing method of claim 1, wherein the switching to the SCPC mesh network communication mode includes:
   transmitting an SCPC mesh network connection request message for the destination terminal to the central station;
   receiving, from the central station, the TBTP information including a time slot resource allocated in response to the SCPC mesh network communication request message; and
   operating in the SCPC mesh network communication mode between the terminals based on the TBTP information.

7. The star network and mesh network accessing method of claim 1, wherein, in the time slot resource, integer multiple traffic bursts are dynamically allocated in units of frame period in response to a request from the source terminal or the destination terminal.

8. The star network and mesh network accessing method of claim 1, wherein traffic burst to be connected to the TDMA mesh network or the SCPC mesh network includes:
   Internet Protocol (IP) information divided into run-length encoding (RLE) packets based on a size of burst payload to be packed in a burst payload with a burst header; and
   a burst header including source identification information for identifying a source terminal and destination identification information for identifying a destination terminal.

9. The star network and mesh network accessing method of claim 1, wherein traffic burst to be connected to the TDMA star network includes:
   IP information divided into RLE packets based on a size of burst payload to be packed in a burst payload with a burst header; and
   a burst header including source identification information for identifying a source terminal and network identification information for distinguishing between a star network and a mesh network.

10. A satellite communication system comprising:
   a source terminal configured to receive time slot resources from a central station, operate in a time division multiple access (TDMA) star network communication mode between the central station and a terminal, transfer a TDMA mesh network connection request message for a destination terminal to the central station, receive traffic burst time plan (TBTP) information corresponding to the TDMA mesh network connection request message from the central station, operate in a TDMA mesh network communication mode between terminals, and switch from the TDMA mesh network communication mode between the terminals to a single channel per carrier (SCPC) mesh network communication mode between the terminals when Voice over Internet Protocol (VoIP) traffic is greater than a threshold.

11. The satellite communication system of claim 10, wherein the source terminal is configured to operate in a TDMA star network communication mode between the central station and the terminal when the TDMA mesh network communication mode between the terminals or the SCPC mesh network communication mode between the terminals is terminated.

12. The satellite communication system of claim 10, wherein the source terminal is configured to switch from the SCPC mesh network communication mode between the terminals to the TDMA mesh network communication mode between the terminals when an operation is performed in the SCPC mesh network communication mode and the VoIP traffic is less than the threshold.

13. The satellite communication system of claim 10, wherein the source terminal is configured to transmit the TDMA mesh network connection request message for the destination terminal to the central station, receive, from the central station, a TDMA mesh network connection response message of the destination terminal in response to the TDMA mesh network connection request message, receive the TBTP information from the central station via a time-division multiplexing (TDM) forward link, and operate in the TDMA mesh network communication mode between the terminals based on the TBTP information.

14. The satellite communication system of claim 10, wherein the source terminal is configured to transmit an SCPC mesh network connection request message for the destination terminal to the central station, receive, from the central station, the TBTP information including a time slot resource allocated in response to the SCPC mesh network communication request message, and operate in the SCPC mesh network communication mode between the terminals based on the TBTP information.

15. The satellite communication system of claim 10, wherein, in the time slot resource, integer multiple traffic bursts are dynamically allocated in units of frame period in response to a request from the source terminal or the destination terminal.

16. The satellite communication system of claim 10, wherein traffic burst to be connected to the TDMA mesh network or the SCPC mesh network includes:
   Internet protocol (IP) information divided into RLE packets based on a size of burst payload to be packed in a burst payload with a burst header; and
   a burst header including source identification information for identifying a source terminal and destination identification information for identifying a destination terminal.

17. The satellite communication system of claim 10, wherein traffic burst to be connected to the TDMA star network includes:
   IP information divided into RLE packets based on a size of burst payload to be packed in a burst payload with a burst header; and
   a burst header including source identification information for identifying a source terminal and network identification information for distinguishing between a star network and a mesh network.

* * * * *